United States Patent [19]

Koistinen

[11] Patent Number: 4,565,285

[45] Date of Patent: Jan. 21, 1986

[54] TUBE BELT CONVEYOR

[75] Inventor: Pauli A. T. Koistinen, Joensuu, Finland

[73] Assignee: Outokumpu Oy, Helsinki, Finland

[21] Appl. No.: 562,395

[22] Filed: Dec. 15, 1983

[30] Foreign Application Priority Data

Jan. 4, 1983 [FI] Finland ................................. 830012

[51] Int. Cl.$^4$ ............................................. B65G 15/08
[52] U.S. Cl. ..................................... 198/819; 198/839
[58] Field of Search ................................ 198/819, 839

[56] References Cited

FOREIGN PATENT DOCUMENTS

| 1067365 | 10/1959 | Fed. Rep. of Germany | 198/839 |
| 2331897 | 1/1975 | Fed. Rep. of Germany | 198/819 |
| 665957 | 2/1952 | United Kingdom | 198/819 |
| 1075557 | 7/1967 | United Kingdom | 198/819 |
| 2061853 | 5/1981 | United Kingdom | 198/819 |

Primary Examiner—Joseph E. Valenza
Assistant Examiner—Michael Stone
Attorney, Agent, or Firm—John Smith-Hill

[57] ABSTRACT

The present invention concerns a tube belt conveyor in which a flat belt (1) is like a helically seamed tube at least over the length of its transporting part. Tubularity of the belt (1) has been achieved by winding the flat belt helically to be tubular about its longitudinal axis and by disposing the helically seamed tube between the bending drum (3) and traction drum (5) of the conveyor. The helical configuration is produced and maintained by the aid of roller sets (7 and 9). In the helically seamed tube belt it is possible, if desired, to make bends by means of bending roller sets (8). It is possible to transport material with the tube belt conveyor in different planes between the horizontal plane and the vertical plane.

7 Claims, 6 Drawing Figures

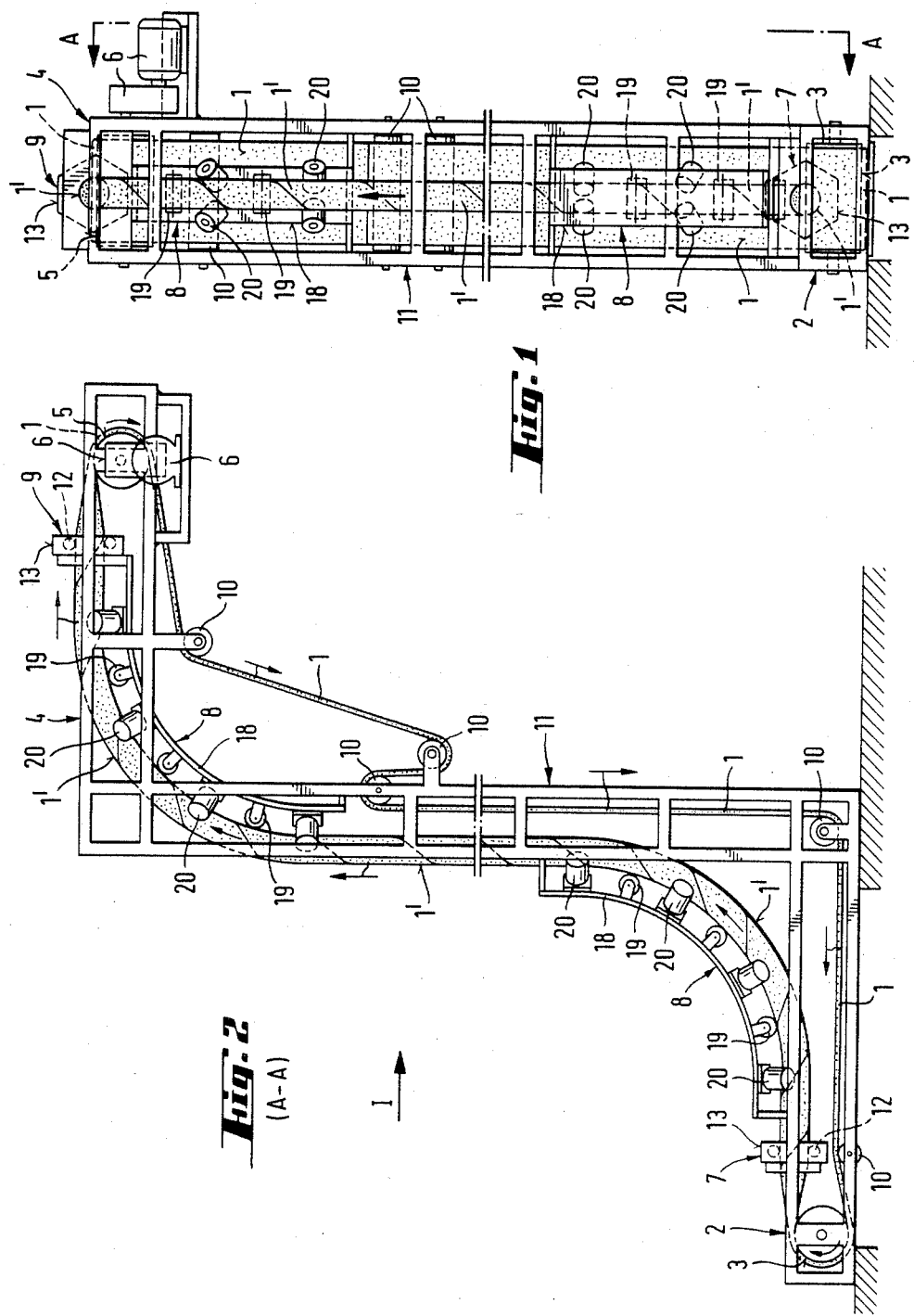

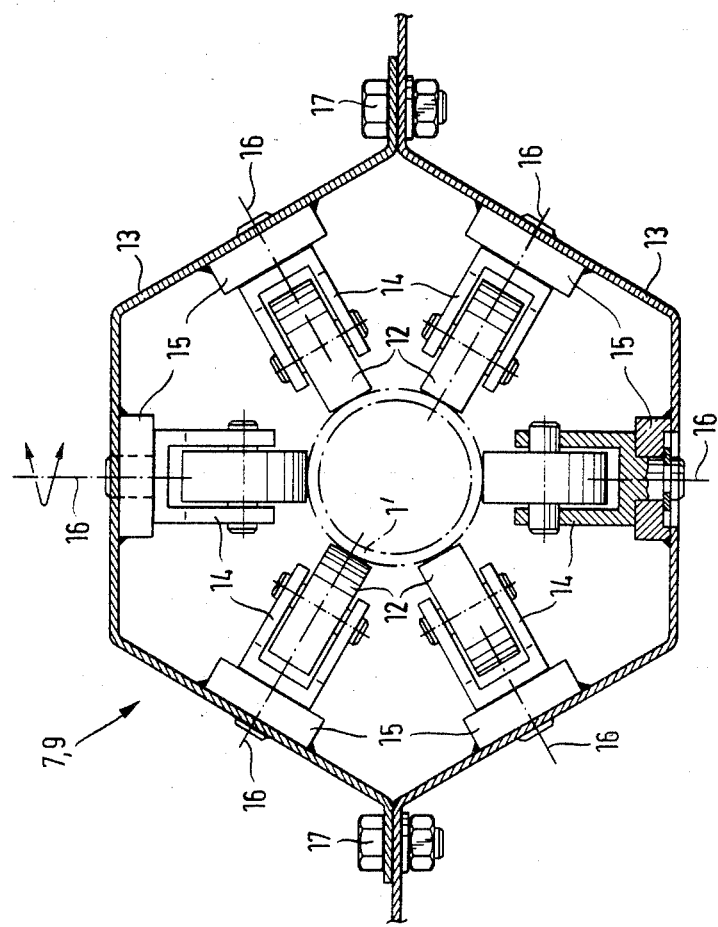
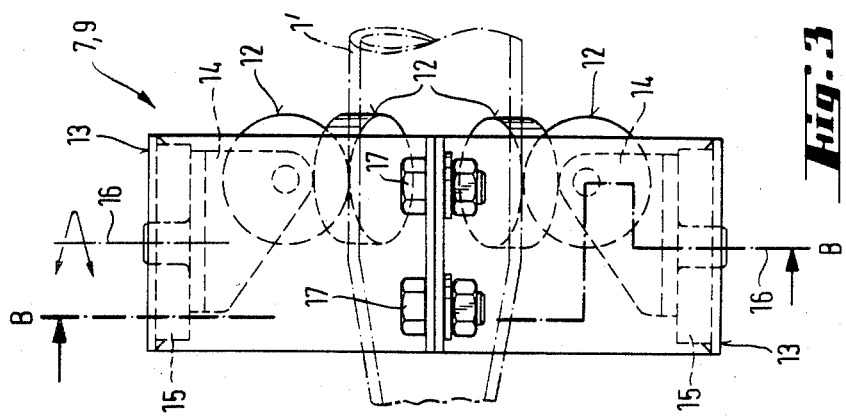

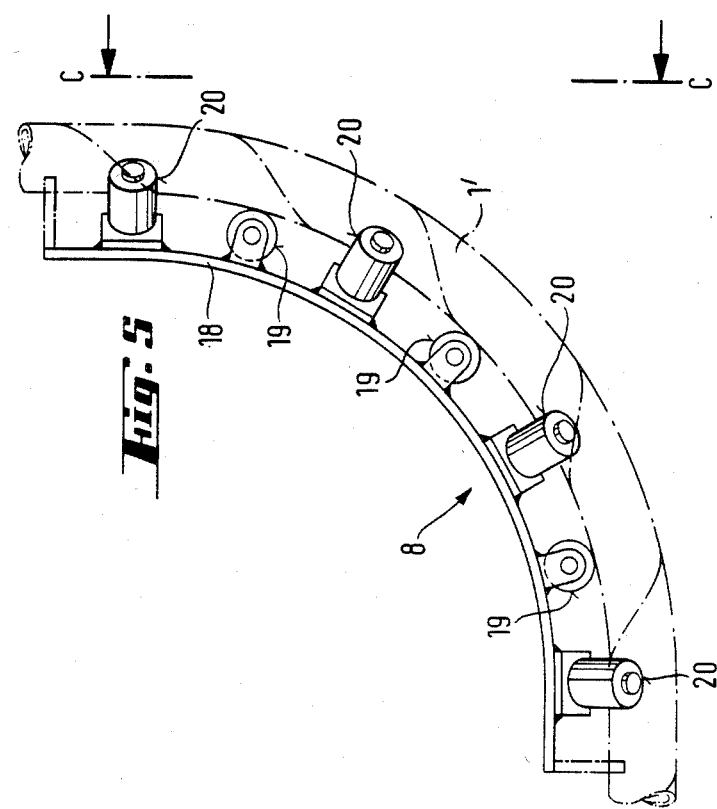
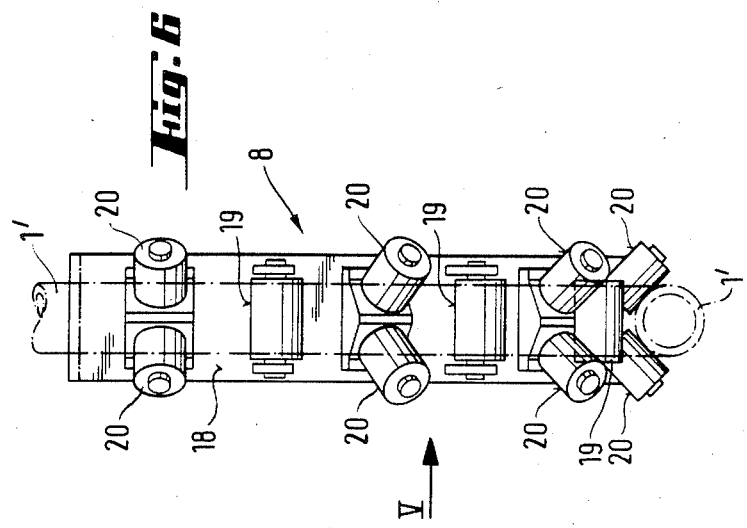

TUBE BELT CONVEYOR

The present invention concerns a tube conveyor in which a flat belt is by the aid of guide rollers formed into a helically seamed tube rotating about itself and moving forward and which is well sealed and fit for transporting objects.

It is commonly known in prior art to form an elastic material such as rubber into a tube inside which the objects travel. In designs of prior art, the closing/opening seam of the tube is parallel with the longitudinal axis of the tube conveyor. Hence the tube has to be closed separately either by margin interlocking structures or by a spring-like belt structure which tends to maintain the belt in the shape of a well-sealed tube. The special closure structures implied by the straight configuration of the closure margin cause tube belt conveyors in present use to be expensive, unreliable, and costly to operate, wherefore tube conveyors have not become more common.

The object is with the tube belt conveyor of the invention to eliminate the drawbacks resulting from the tubular shaping of the tube belt conveyors mentioned in the state of art, and at the same time to improve the conveyors reliability in operation, and to produce a conveyor where rendering the conveyor belt tubular is accomplished by forming a flat belt into a helically seamed tube belt. The essential characteristic features of the invention are readable in claim 1.

In the tube belt conveyor of the invention, the closure of the helically seamed tubes is simple and reliable in operation. The belt conveys material at varying inclinations from the horizontal to the vertical plane, this being particularly aided by the rotation of the helical tube. In addition, the constriction of the helical tube around the material promotes the passage of the material along with the helically seamed tube. In the tube belt conveyor of the invention, the loading and unloading ends of the belt in the tube belt conveyor are like those of a normal flat belt conveyor. Hereby, the supplying onto the conveyor and discharging from the conveyor of the material that is being transported can be carried out in ways known in themselves in the art. The return belt may run either as a normal flat belt, or as a helical tube when such is necessary owing to a winding path.

It is thus possible for a tube belt conveyor according to the invention to use a simple and inexpensive flat belt in such manner that transport is feasible vertically or horizontally, or varying the requisite angle of transportation between vertical and horizontal. In addition, the path of the conveyor may wind either in the horizontal or vertical plane. Thanks to the advantageous shape of the belt, the conveyor of the invention can be utilized for instance in transporting dust-raising materials.

The tube belt conveyor of the invention is described in the following referring to the drawings attached, wherein FIG. 1 presents an embodiment of the invention, intended for vertical transporting, FIG. 2 shows the embodiment of FIG. 1 viewed in the direction A—A.

FIG. 3 presents a roller set for imparting and maintaining the helical shape in the embodiment of FIG. 1.

FIG. 4 shows the roller set of FIG. 3 along the section B—B.

FIG. 5 presents a bending roller set in the embodiment of FIG. 1 in elevational view.

FIG. 6 shows the bending roller set of FIG. 5 viewed in the direction C—C.

As shown in FIGS. 1 and 2, the conveyor belt 1 is, as taught by the invention, shaped to be a helically seamed tube 1' between the bending drum 3 in the lower part 2 of the frame of the conveyor and the traction drum 5 in the upper part 4 of the frame. The drive machinery 6 for the traction drum 5 is located on the end of the upper part 4 of the conveyor. When the conveyor is started, the return belt 1 goes in flat shape over the return/tensioning rollers 10 to the bending drum 3. Alternatively, the return belt may be either partly or wholly in helically seamed tube form. From the bending drum 3 and belt 1 is carried onwards to the helical shape-imparting roller set 7. By the aid of the bending roller sets 8, the belt 1 in the form of a helically seamed tube 1' is bent in the desired direction of travel. A second helical shape-imparting roller set 9 is provided before the traction drum 5 at the discharge end of the helically seamed tube, in order to ensure that the belt 1 will not unfold prematurely from its helically seamed. Between the lower end 2 of the conveyor frame and the upper end 4 of the conveyor frame is inserted, when needed, an intermediate part 11 of the conveyor frame. The lower and upper ends of the conveyor frame may also be secured without intermediate part for instance to different levels of a building or different rock levels.

As shown in FIGS. 3 and 4, the helical shape-imparting roller set 7 and the roller set 9 maintaining the helical shape are each composed of rollers 12, inserted in a frame 13. The frame 13 consists of two parts which have been joined to each other by juncture members 17. The rollers 12 are mounted to the frame 13 by means of carrier members 14 and plates 15. In order for the rollers 12 to become guided in accordance with the helix of the conveyor belt 1, the carrier members 14 mounted on the plates 15 that they can swivel together with the carrier members 14 about the pivot axes 16.

As shown in FIGS. 5 and 6, the bending roller set 8 consists of a frame 18 which has been given arcuate form with desired radius. To the frame 18 have been attached the rollers 19 lying against the inner side of the bend described by the helically seamed tube 1', and rollers 20 lying against the sides of the inside curve. The rollers 19 have been mounted at an angle with reference to the direction of travel of the helically seamed tube 1' which is consistent with the shape of the helically seamed tube.

I claim:

1. A tube belt conveyor, comprising first and second drum members respectively defining a load end and a discharge end of a conveyor path, an endless flexible belt trained about said drum members, that portion of the belt that extends along the conveyor path having first and second major faces and being helically twisted so that said portion of the belt can be formed into a tube with said first major face inwards and an edge region of said portion of the belt overlapping said second major face and extending along a generally helical line through at least one complete revolution from said loading end to said discharge end, and the conveyor also comprising means for driving at least one of said drum members to rotate and drive the belt along the conveyor path in the direction from the loading end to the discharge end, and means at the loading end of the conveyor path for maintaining the twisted portion of the belt in tubular form.

2. A conveyor according to claim 1, further comprising means at the discharge end of the conveyor path for maintaining said twisted portion of the belt in tubular shape.

3. A conveyor according to claim 1, wherein the drive means are connected drivingly to the second drum member.

4. A conveyor according to claim 1, wherein the belt is essentially flat when passing along the return path from the discharge end to the loading end.

5. A conveyor according to claim 1, wherein the discharge end is at a different vertical height from the loading end.

6. A conveyor according to claim 1, comprising at least one roller set disposed along the conveyor path between the loading end and the discharge end and defining a bend in the conveyor path.

7. A conveyor according to claim 1, wherein each edge region of the belt is essentially flat.

* * * * *